(12) United States Patent
Lee

(10) Patent No.: US 11,886,863 B2
(45) Date of Patent: Jan. 30, 2024

(54) MOBILITY SYSTEM AND METHOD FOR MANAGING UPDATING THEREOF

(71) Applicants: HYUNDAI MOTOR COMPANY, Seoul (KR); Kia Corporation, Seoul (KR)

(72) Inventor: Tae Ho Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 2 days.

(21) Appl. No.: 17/724,984

(22) Filed: Apr. 20, 2022

(65) Prior Publication Data
US 2023/0121627 A1    Apr. 20, 2023

(30) Foreign Application Priority Data
Oct. 14, 2021   (KR) .................. 10-2021-0136928

(51) Int. Cl.
| | |
|---|---|
| *G06F 8/65* | (2018.01) |
| *H02J 7/00* | (2006.01) |
| *B60L 1/00* | (2006.01) |
| *B60L 58/18* | (2019.01) |
| *B60L 58/12* | (2019.01) |
| *B60L 3/00* | (2019.01) |
| *B60L 58/24* | (2019.01) |

(52) U.S. Cl.
CPC .................. *G06F 8/65* (2013.01); *B60L 1/00* (2013.01); *B60L 3/0046* (2013.01); *B60L 58/12* (2019.02); *B60L 58/18* (2019.02); *B60L 58/24* (2019.02); *H02J 7/0013* (2013.01); *H02J 7/0063* (2013.01); *B60L 2240/545* (2013.01)

(58) Field of Classification Search
None
See application file for complete search history.

(56) References Cited

U.S. PATENT DOCUMENTS

| | | | |
|---|---|---|---|
| 2020/0192655 A1* | 6/2020 | Jeong ........................ | G06F 8/65 |
| 2021/0320519 A1* | 10/2021 | Chuang .............. | H01M 10/441 |
| 2022/0094155 A1* | 3/2022 | Jiang ..................... | H02J 7/0024 |

* cited by examiner

Primary Examiner — Jared Fureman
Assistant Examiner — Aqeel H Bukhari
(74) Attorney, Agent, or Firm — MORGAN, LEWIS & BOCKIUS LLP

(57) ABSTRACT

A mobility system includes: one or more controllers; one or more batteries; a switching device configured to switch connections between the one or more controllers and the one or more batteries; and a processor configured to control an order of update target controllers among the one or more controllers and batteries to supply power to the update target controllers among the one or more batteries by controlling the switching device based on at least one of relative importance of the one or more controllers, a present state of the one or more batteries, or a vehicle driving state.

20 Claims, 6 Drawing Sheets

MOBILITY SYSTEM AND METHOD FOR MANAGING UPDATING THEREOF

CROSS-REFERENCE TO RELATED APPLICATION

This application claims the benefit of priority to Korean Patent Application No. 10-2021-0136928, filed in the Korean Intellectual Property Office on Oct. 14, 2021, the entire contents of which are incorporated herein by reference.

BACKGROUND

(a) Technical Field

The present disclosure relates to a mobility system and an update management method thereof, and more particularly, present disclosure to a technique for switching power supply for updating a battery-based mobility system.

(b) Description of the Related Art

With development of the vehicle industry, in-vehicle controllers are continuously developed to provide convenience to drivers, and these controllers are updated with software, etc. based on wireless communication. In general, a controller of an internal combustion engine vehicle performs an update when vehicle starting is turned on. However, when the vehicle starting is not turned on, the update is carried out in a state where a battery thereof is sufficiently charged, and when the battery is not sufficiently charged, the update is not performed. Recently, even in a battery-based vehicle (mobility system), controllers directly related to driving, as in an internal combustion engine vehicle, are difficult to update when starting is on, so the update is performed when the starting is off, and in this case, the update is interrupted or difficult problems occur due to a risk of battery discharge by performing the update only with a charged battery in a starting-off state.

The information disclosed in the Background section above is to aid in the understanding of the background of the present disclosure, and should not be taken as acknowledgement that this information forms any part of prior art.

SUMMARY

An exemplary embodiment of the present disclosure has been made in an effort to provide a mobility system and an update management method thereof, capable of providing a stable update by efficiently switching power supply mapping between a controller and a battery in consideration of states of batteries providing a voltage for updating a battery-based mobility system.

The various aspects of the present disclosure are not limited to the features mentioned above, and other technical features not mentioned can be clearly understood by those skilled in the art from the description of the claims.

An exemplary embodiment of the present disclosure provides a mobility system including: one or more controllers; one or more batteries; a switching device configured to switch connections between the one or more controllers and the one or more batteries; and a processor configured to control an order of update target controllers among the one or more controllers and batteries to supply power to the update target controllers among the one or more batteries by controlling the switching device based on at least one of relative importance of the one or more controllers, a present state of the one or more batteries, or a vehicle driving state.

In an exemplary embodiment, one or more switching elements configured for one-to-one correspondence between the one or more controllers and the one or more batteries may be included.

In an exemplary embodiment, the one or more batteries may include a first battery and a second battery, and the one or more controllers may include a first controller and a second controller.

In an exemplary embodiment, the switching device may include: a first switching element connected between the first battery and the first controller; a second switching element connected between the first battery and the second controller; a third switching device connected between the second battery and the first controller; and a fourth switching element connected between the second battery and the second controller.

In an exemplary embodiment, the update management apparatus may control the first switching element to be closed and the second switching element to be opened such that the first battery supplies power to the first controller, and control the third switching element to be opened and the fourth switching element to be closed such that the second battery supplies power to the second controller.

In an exemplary embodiment, the update management apparatus, when a battery capacity level of the one or more batteries is less than estimated power consumption for updating a controller to which the one or more batteries supply power, may control power to be supplied to a corresponding controller by using another battery having a sufficient battery capacity level among the one or more batteries.

In an exemplary embodiment, the update management apparatus, when a battery capacity level of the first battery is less than a battery capacity level required for the update of the first controller, may use the second battery by opening the first switching element and closing the third switching element to update the first controller.

In an exemplary embodiment, the update management apparatus, when the first controller has higher update importance than the second controller, a battery capacity level of the first battery is less than a battery capacity level required for the update of the first controller, and a battery capacity level of the second battery is less than a sum of battery capacity levels required for updating the first controller and the second controller, may open the first switching element and the fourth switching element, and may close the third switching element.

In an exemplary embodiment, the update management apparatus, in a case where the first controller among the one or more controllers are not able to be updated while the vehicle is driving and the second controller among the one or more controllers are able to be updated while the vehicle is driving, and in the case where the vehicle starts driving during the update of the first controller while the vehicle is stopped, may stop the update of the first controller and may perform the update of the second controller first by opening the first switching element.

In an exemplary embodiment, the update management apparatus may determine that temperature abnormality of the one or more batteries has occurred.

In an exemplary embodiment, the update management apparatus, when a temperature of the one or more batteries rises by a predetermined amount for a predetermined time, or the temperature of the one or more batteries rises above a predetermined temperature, may determine that temperature abnormality of the one or more batteries has occurred.

In an exemplary embodiment, the update management apparatus, when the temperature of the first battery is abnormal, may open the first switching element, and may close the third switching element.

In an exemplary embodiment, the update management apparatus, when overheating of the second battery or insufficient charge thereof is expected, may open the fourth switching element.

An exemplary embodiment of the present disclosure provides an update management method of a mobility system, including: determining an update order of update target controllers among one or more controllers and batteries to supply power to the update target controllers among one or more batteries by using at least one of relative importance of the one or more controllers, a present state of the one or more batteries, or a vehicle driving state; and switching connections between the update target controllers and the batteries to supply power depending on a determined result of the determining.

In an exemplary embodiment, the switching may include controlling switching elements configured for one-to-one correspondence between the one or more controllers and the one or more batteries.

In an exemplary embodiment, the determining may include: performing an update by using a first battery among the one or more batteries when updating a first controller among the one or more controllers; and performing an update by using a second battery among the one or more batteries when updating a second controller among the one or more controllers.

In an exemplary embodiment, the switching may include when a battery capacity level of the first battery among the one or more batteries is smaller than a battery capacity level required for the update of the first controller, opening a first switching element connected between the first battery and the first controller; maintaining an open state of a second switching element connected between the first battery and the second controller; closing a third switching element connected between the second battery and the first controller; and maintaining an open state of a fourth switching element connected between the second battery and the second controller.

In an exemplary embodiment, the switching may include when the first controller has higher update importance than the second controller, a battery capacity level of the first battery is less than a battery capacity level required for the update of the first controller, and a battery capacity level of the second battery is less than a sum of battery capacity levels required for updating the first controller and the second controller, opening the first switching element and the fourth switching element, and closing the third switching element.

In an exemplary embodiment, the switching may include in the case where the first controller is not able to be updated while the vehicle is driving and the second controller is able to be updated while the vehicle is driving, and in the case where the vehicle starts driving during the update of the first controller while the vehicle is stopped, stopping the update of the first controller and performing the update of the second controller first by opening the first switching element.

In an exemplary embodiment, the switching may include when the temperature of the first battery is abnormal, opening the first switching element, and closing the third switching element.

According to the present technique, it is possible to provide a stable update by efficiently switching power supply mapping between a controller and a battery in consideration of states of batteries providing a voltage for updating a battery-based mobility system.

In addition, various effects that can be directly or indirectly identified through this document may be provided.

DETAILED DESCRIPTION OF THE EMBODIMENTS

Figure 1:
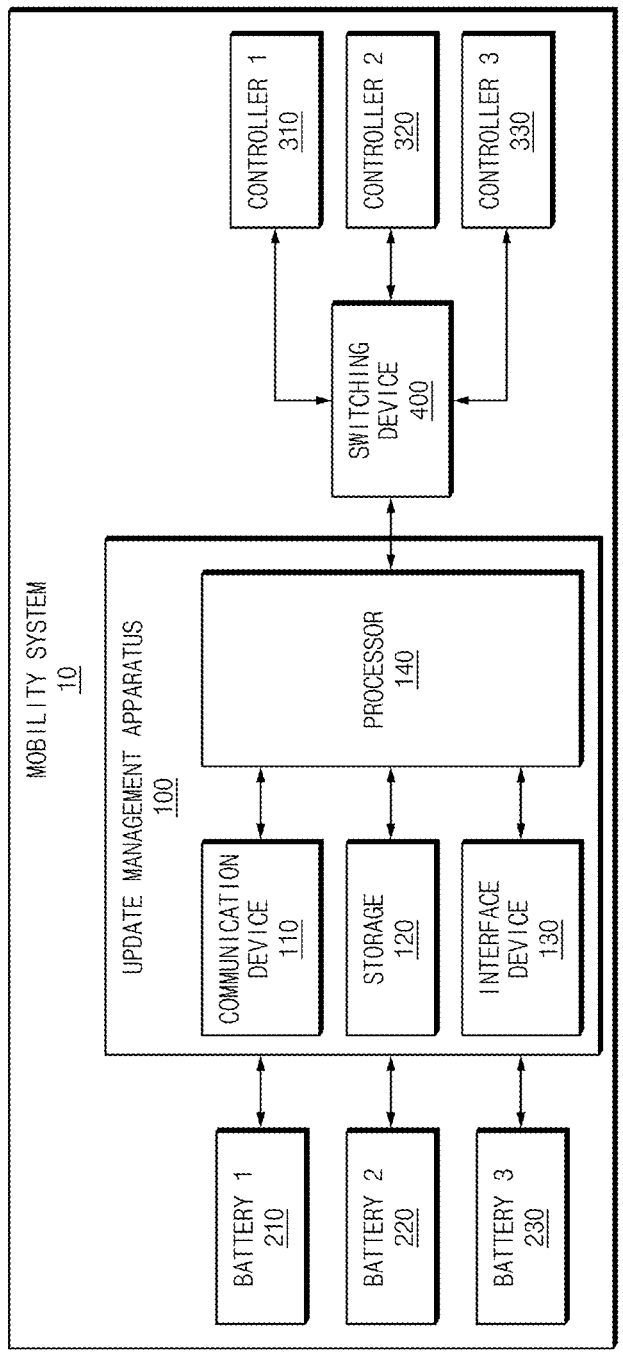
FIG. 1 illustrates a block diagram showing a configuration of a battery-based mobility system including an update management apparatus according to an exemplary embodiment of the present disclosure.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIG. 1 to FIG. 6.

FIG. 1 illustrates a block diagram showing a configuration of a battery-based mobility system including an update management apparatus according to an exemplary embodiment of the present disclosure.

The battery-based mobility system may include an electric vehicle, a hydrogen fuel cell vehicle, an urban air mobility (UAM), an electric powered vessel, an electric scooter, and the like. This mobility system 10 forms energy providing environment differently compared to controller update logic of an internal combustion engine.

Referring to FIG. 1, the mobility system 10 includes an update management apparatus 100, first, second, and third batteries 210, 220, and 230, and a plurality of first, second, and third controllers 310, 320, and 330, which are targets to be updated. In this case, the first battery 210 may be a driving system battery as a main battery, and the second and third batteries 220 and 230 may be configured as auxiliary batteries. Although an example including three controllers and three batteries is illustrated in FIG. 1, the present disclosure is not limited thereto, and a number thereof may be variously provided.

The update management apparatus 100 according to the present disclosure may control an order of the update target controllers and a battery to supply power to the update target controllers by controlling opening and closing of a switching device 400 connected between the first, second, and third batteries 210, 220, and 230, and the first, second, and third update target controllers 310, 320, and 330 based on at least one of importance of the one or more controllers, a present state of the one or more batteries, or a vehicle driving state.

The update management apparatus 100 according to the exemplary embodiment of the present disclosure may be implemented inside the vehicle. In this case, the update management apparatus 100 may be integrally formed with internal control units of the vehicle, or may be implemented as a separate device to be connected to control units of the vehicle by a separate connection means.

The update management apparatus 100 may determine an order of target controllers to be updated and a battery for supplying the target controllers to be updated based on at least one of importance of one or more of the controllers 210, 320, and 330, a present state of the one or more of the batteries 300 and 400, or a vehicle driving state.

Referring to FIG. 1, the update management apparatus 100 may include a communication device 110, a storage 120, an interface device 130, a processor 140, and the switching device 400.

The communication device 110 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, Ethernet communication, and the like. For example, the communication device 110 may communicate with the batteries 210, 220, 230 and the controllers 310, 320, and 330, and may receive battery present state information from the batteries 210, 220, and 230. The battery present state information may include current battery capacity levels of batteries 210, 220, and 230.

In addition, the communication device 110 may perform communication by using a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, world Interoperability for microwave access (Wimax), etc.

For example, the communication device 110 may receive information for an update from an external server or a vehicle.

The storage 120 may store data and/or algorithms required for the processor 140 to operate, and the like.

As an example, the storage 120 may store the importance of at least one of the controllers 210, 320, and 330, current battery state information received from each of the batteries 210, 220, and 230, and the like.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the apparatus 100 and results thereof. Herein, the input means may include a key button, and may further include a mouse, a joystick, a jog shuttle, a stylus pen, and the like. In addition, the input means may further include a soft key implemented on the display.

For example, the interface device 130 may display a state of each of the battery 210, 220, and 230, an update state of each of the controller 210, 320, 330, and the like.

The interface device 130 may be implemented as a head-up display (HUD), a cluster, an audio video navigation (AVN), a human machine interface (HM), a user setting menu (USM), or the like.

The output means may include a display, and may further include a voice output means such as a speaker. In this case, when a touch sensor formed of a touch film, a touch sheet, or a touch pad is provided on the display, the display may operate as a touch screen, and may be implemented in a form in which an input device and an output device are integrated.

In this case, the display may include at least one of a liquid crystal display (LCD), a thin film transistor liquid crystal display (TFT LCD), an organic light emitting diode display (OLED display), a flexible display, a field emission display (FED), or a 3D display.

The processor 140 may be electrically connected to the communication device 110, the storage 120, the interface device 130, and the like, may electrically control each component, and may be an electrical circuit that executes software commands, thereby performing various data processing and calculations described below.

The processor 140 may process a signal transferred between components of the update management apparatus 100, and may perform overall control such that each of the components can perform its function normally.

The processor 140 may be implemented in the form of hardware, software, or a combination of hardware and software, or may be implemented as microprocessor, and may be, e.g., an electronic control unit (ECU), a micro controller unit (MCU), or other sub-controllers mounted in the vehicle.

The processor 140 may control an order of update target controllers and a battery to supply power to the update target controllers by controlling the switching device based on at least one of importance of the one or more controllers, a present state of the one or more batteries, or a vehicle driving state.

The processor 140 closes a switching element S1 such that the first battery 210 supplies power to the first controller 310, closes a switching element S5 such that the second battery 220 supplies power to the second controller 320, and closes a switching element S9 such that the third battery 230 supplies power to the third controller 330.

When the battery capacity levels of the one or more batteries is less than estimated power consumption for the update of the controller to which the one or more batteries supply power, the processor 140 may control another battery with a sufficient remaining amount among at least one or more batteries to be used to supply power to the corresponding controller.

That is, when the battery capacity level of the first battery 210 is lower than the battery capacity level required for updating the first controller 310, the processor 140 opens the switching element S1 and closes the switching element S4 to update the first controller 310 by using the second battery 220.

The processor 140 opens the switching element S1 and a switching element S5, and closes the switching element S4 when the first controller 310 has higher update importance than the second controller 320, the battery capacity level of the first battery 210 is lower than the battery capacity level required for updating the first controller 310, and the battery capacity level of the second battery 220 is less than a sum of the battery capacity levels required for updating the first controller 310 and the second controller 320.

The processor 140 opens the switching element S1 to stop the update of the first controller 310 and performs the update of the second controller 320 first when the first controller 310 among the one or more controllers cannot be updated while the vehicle is driving, the second controller 320 among the one or more controllers can be updated while the vehicle is driving, and the vehicle starts driving while the first controller 310 is updated in a stopped state of the vehicle.

The processor 140 may determine that temperature abnormality of at least one battery has occurred when a temperature of one or more batteries rises by a predetermined amount for a predetermined time, or the temperature of at one or more batteries rises above a predetermined temperature.

When the temperature of the first battery 210 is abnormal, the processor 140 may open the switching element S1 and close the switching element S4 to update the controller 1 310 by using the second battery 220.

The processor 140 may open the switching elements S4, S5, and S6 when overheating of the second battery 220 or insufficient charge thereof is expected.

The processor 140 determines mapping for power supply in consideration of characteristics and states of batteries and characteristics and states of controllers. In addition, the processor 140 controls the switching device 400 to respectively connect the batteries 210, 220, 230 and the controllers 310, 320, and 330 depending on a mapping determination result thereof.

The switching device 400 includes one or more switching elements S1 to S9, and a number of the switching elements may be determined depending on numbers of batteries and controllers. In this case, the switching device 400 is not limited to a physical switch, and may control connections between the batteries and the controllers based on an algorithm. One or more switching elements S1 to S9 of the switching device 400 may be provided for one-to-one correspondence between the batteries 210, 220, 230 and the controllers 310, 320, and 330.

That is, the switching device 400 may include a switching element S1 connected between the first battery 210 and the first controller 310, a switching element S2 connected between the first battery 210 and the second controller 320, a switching element S3 connected between the first battery 210 and the third controller 330, a switching element S4 connected between the second battery 220 and the first controller 310, a switching element S5 connected between the second battery 220 and the second controller 320, a switching element S6 connected between the second battery 220 and the third controller 330, a switching element S7 connected between the third battery 230 and the first controller 310, a switching element S8 connected between the third battery 230 and the second controller 320, and a switching element S9 connected between the third battery 230 and the third controller 330.

The first, second, and third controllers 210, 220, and 230 may supply power for driving the mobility system 10. Although 3 batteries are illustrated in FIG. 1, the present disclosure is not limited thereto, and fewer or more battery may be provided.

The first battery 210 may be driven as a driving system battery, and the second and third batteries 220 and 230 may be driven as auxiliary batteries.

The first, second, and third controllers 210, 320, and 330 may implement each function of the mobility system 10. Although 3 controllers are illustrated in FIG. 1, the present disclosure is not limited thereto, and fewer or more controllers may be provided.

Hereinafter, an update management method according to an exemplary embodiment of the present disclosure will be described in detail with reference to FIG. 2 to FIG. 5.

Hereinafter, it is assumed that the update management apparatus 100 of FIG. 1 performs the processes of FIG. 2 to FIG. 5. In addition, in the description of FIG. 2 to FIG. 5, operations described as being performed by the update management apparatus 100 may be understood as being controlled by the processor 140 of the update management apparatus 100.

Figure 2:
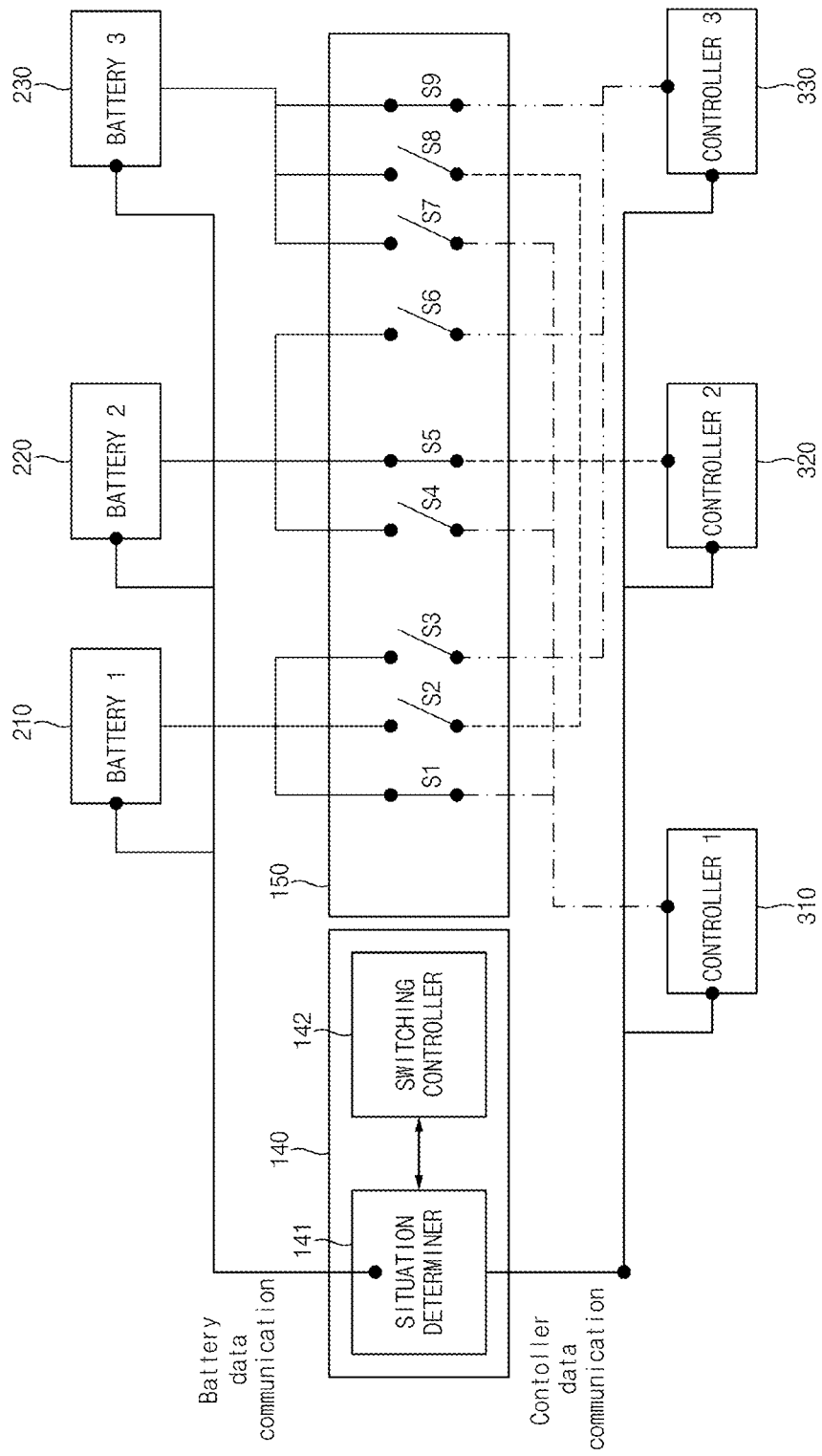
FIG. 2 illustrates an example showing a connection between a battery and a controller according to an exemplary embodiment of the present disclosure.

FIG. 2 illustrates an example showing a connection between a battery and a controller according to an exemplary embodiment of the present disclosure.

Referring to FIG. 2, the first, second, and third batteries 210, 220, and 230 supply power to the first, second, and third controllers 310, 320, and 330, respectively. For that end, the first battery 210 is connected to the first controller 310, the second battery 220 is connected to the second controller 320, and the third battery 230 is connected to the controller 330.

In addition, the processor 140 of FIG. 1 may include a situation determiner 141 and a switching controller 142.

The situation determiner 141 may determine a power supply situation between the batteries 210, 220, and 230 and the controllers 310, 320, and 330 based on the present state information of each of the batteries 210, 220, and 230 to determine connections between the batteries and the controllers. In this case, the situation determiner 141 may obtain present state information from each of the batteries 210, 220, and 230 through the communication device 110.

The switching controller 142 may control connections of the switching elements S1 to S9 connected between the batteries 210, 220, and 230 and the controllers 310, 320, and 330 depending on a determination result of the situation determiner 141.

The switching device 400 includes one or more switching elements S1 to S9. In FIG. 2, an example in which the switching element S1 is connected, the switching elements S2 and S3 are opened, the switching element S5 is connected, the switching elements S4 and S6 are opened, the switching element S9 is connected, and the switching elements S7 and S8 are opened is illustrated.

Accordingly, the processor 140 of the update management apparatus 100 may determine which battery is used to receive power and to perform the update depending on a present state of each of the batteries 210, 220, and 230, and for example, the processor 140 may determine to receive power from the first battery 210 to update the first controller 310 and receive power from the second battery 220 to update the second controller 320, and may determine to perform the update of the third controller 330 by receiving power from the third battery 230.

Figure 3:
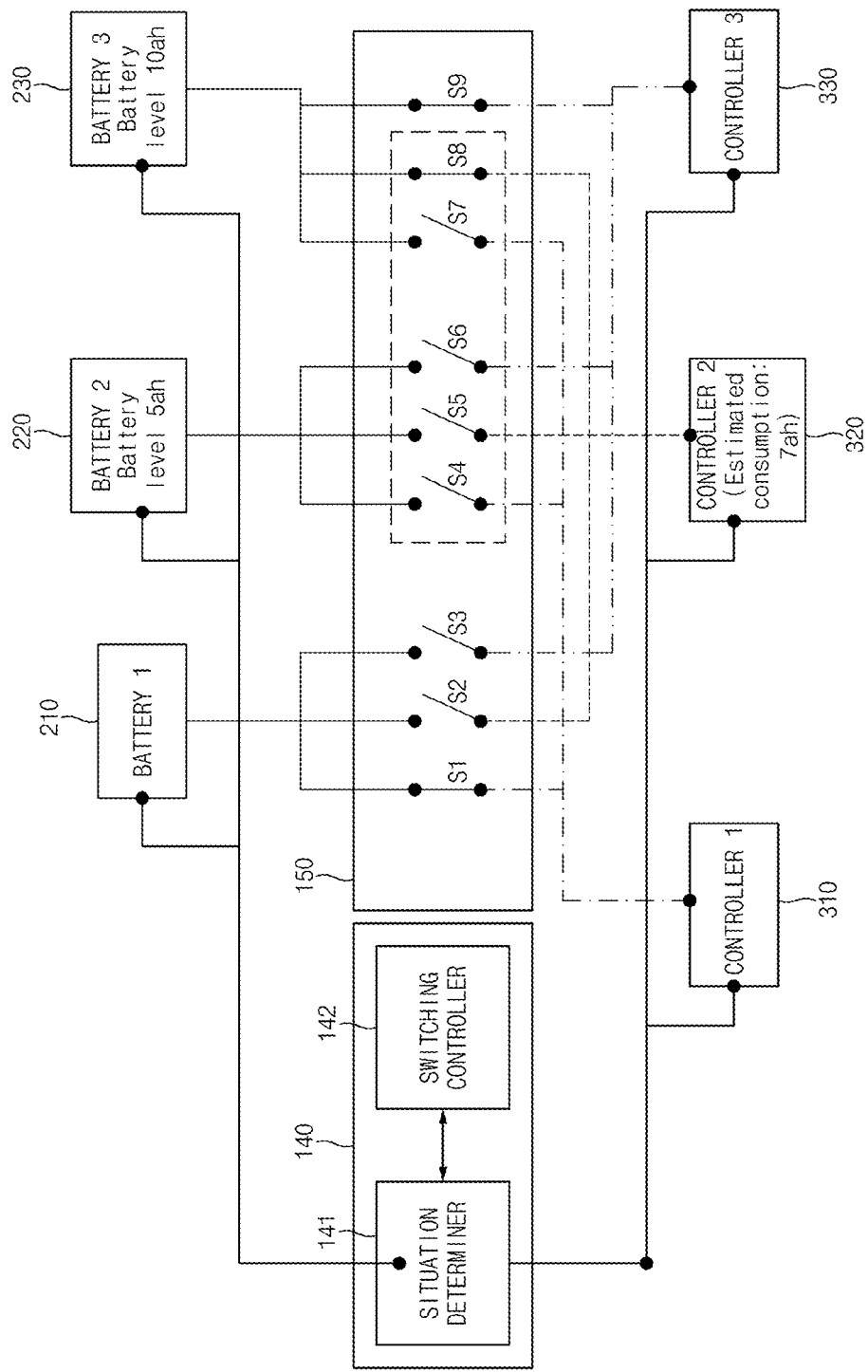
FIG. 3 illustrates a view for describing an example of changing mapping between a battery and a controller when a battery capacity level is insufficient according to an exemplary embodiment of the present disclosure.

FIG. 3 illustrates a view for describing an example of changing mapping between a battery and a controller when a battery capacity level is insufficient according to an exemplary embodiment of the present disclosure.

Referring to FIG. 3, first, the switch S1 is connected such that the first battery 210 supplies power to the first controller 310 as illustrated in FIG. 2, the switch S5 is connected such that the second battery 220 supplies power to the second controller 320, and the switch S9 is connected such that the third battery 230 supplies power to the third controller 330. In this case, the second controller 320 is a controller that places importance on update safety, so that the update is not interrupted. Accordingly, the processor 140 may receive power from the third battery 230 with a sufficient battery capacity level when the current battery capacity level of the second battery 220 is less than expected power consumption of the second controller 320 by checking the current battery capacity level of the second battery 220.

For example, a case where the current battery capacity level of the second battery 220 is 5 Ah, the current battery capacity level of the third battery 230 is 10 Ah, and the estimated power consumption is 7 Ah when the second controller 320 is updated will be described as an example.

The current battery capacity level of the second battery 220 is less than the expected power consumption of the second controller 320, and thus when the update of the second controller 320 is performed by using the second battery 220, power supply may be interrupted during the update, so the update of the second controller 320 may be stopped. However, when the second controller 320 is a controller in which update safety is important and the third controller 330 is less important in update safety than the second controller 320, the update of the second controller 320 should be performed preferentially rather than the third controller 330.

Accordingly, the processor 140 turns off the switch S5 connecting the second battery 220 and the second controller 320, and connects the switch S8. Accordingly, the second controller 320 may receive power from the third battery 230 while receiving power from the second battery 220. Accordingly, the third battery 230 supplies power to the second controller 320 as well as the third controller 330. When the current battery capacity level of the third battery 230 is greater than or equal to a sum of expected power consumption of the second controller 320 and the third controller 330, the third battery 230 may supply power to both the second controller 320 and the third controller 330. However, when the current battery capacity level of the third battery 230 is less than the sum of the expected power consumption of the second controller 320 and the third controller 330, the third battery 230 may be controlled to preferentially supply power to a controller whose update safety is more important.

As such, according to the present disclosure, when the battery capacity level is not sufficient for the update of the currently connected controller, the corresponding controller may be connected to another battery with a sufficient battery capacity level such that it can be powered.

Figure 4:
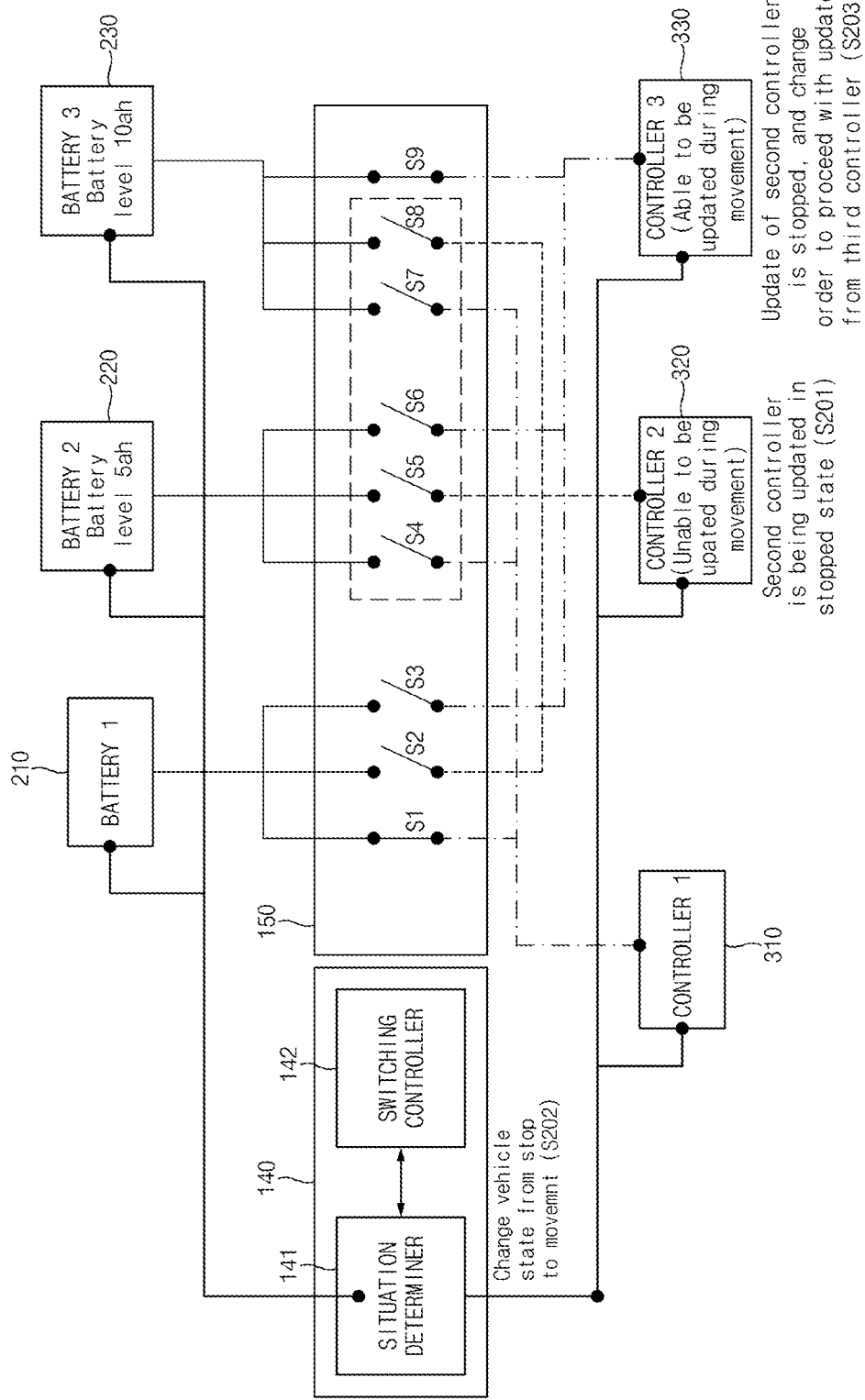
FIG. 4 illustrates a view for describing a process of changing mapping between a battery and a controller depending on an operating state of a mobility system according to an exemplary embodiment of the present disclosure.

FIG. 4 illustrates a view for describing a process of changing mapping between a battery and a controller depending on an operating state of a mobility system according to an exemplary embodiment of the present disclosure.

Referring to FIG. 4, the connections between the batteries and the controllers may be changed or maintained depending on an operating state of the mobility system 10. That is, the processor 140 may control the connections between the batteries and the controllers in consideration of a controller that can be updated when the vehicle is stopped and a controller that cannot be updated when the vehicle is stopped.

For example, it is assumed that the second controller 320 cannot update while moving, and the third controller 330 is a controller that can update while moving. When the vehicle is stopped, the switch S1 is connected such that the first battery 210 supplies power to the first controller 310 as illustrated in FIG. 2, the switch S5 is connected such that the second battery 220 supplies power to the second controller 320, and the switch S9 is connected such that the third battery 230 supplies power to the third controller 330.

When the vehicle starts driving while the second controller 320 is preferentially updated in a state where the vehicle is stopped, the update of the second controller 320 becomes impossible (S202). Accordingly, the processor 140 opens the switch S5 to stop supplying power to the second controller 320 so as to stop the update of the second controller 320. Then, the processor 140 may change an order to proceed with the update from the third controller (S203).

Figure 5:
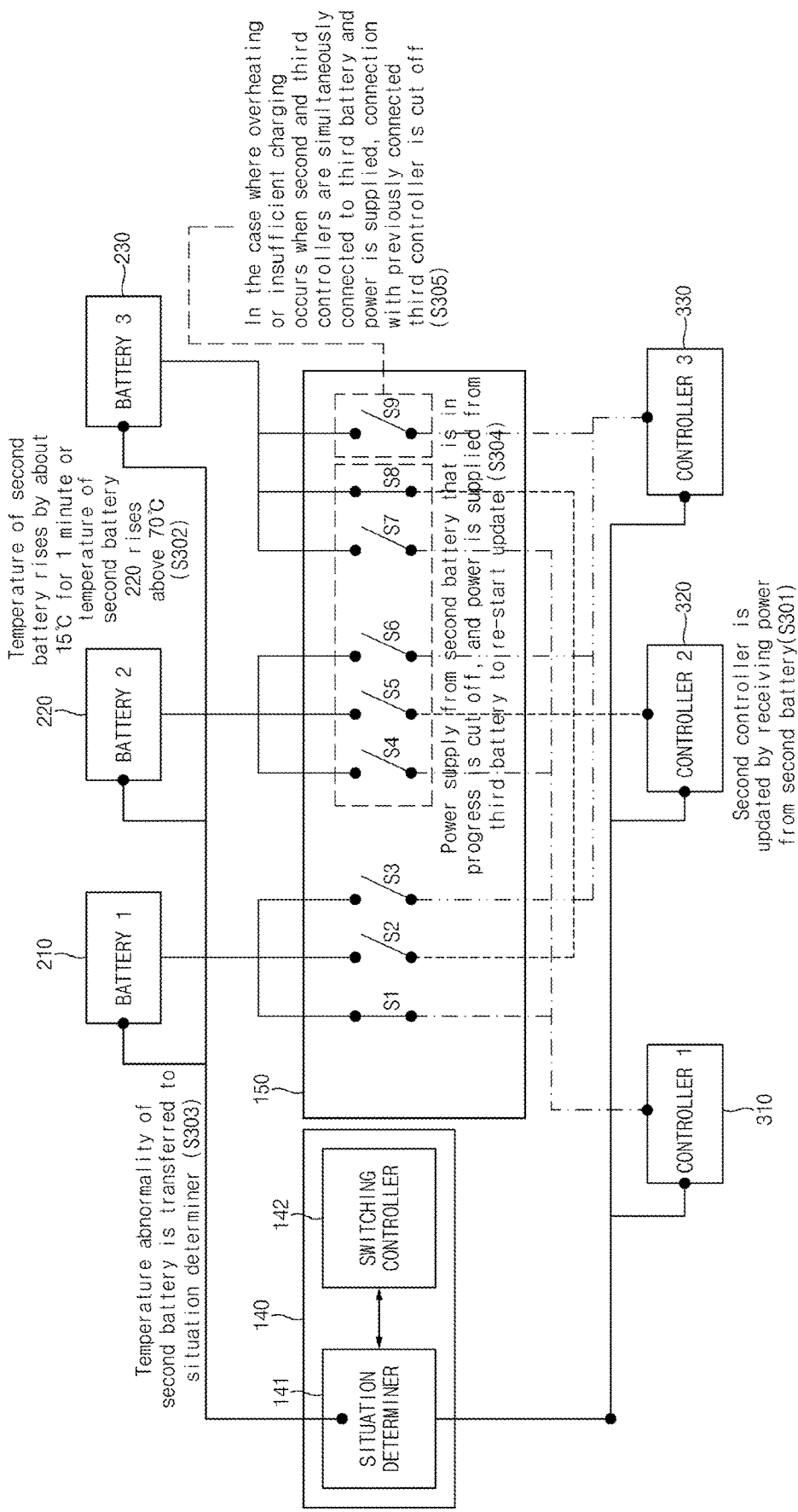
FIG. 5 illustrates a view for describing a process of changing mapping between a battery and a controller depending on a change in a battery temperature according to an exemplary embodiment of the present disclosure.

FIG. 5 illustrates a view for describing a process of changing mapping between a battery and a controller depending on a change in a battery temperature according to an exemplary embodiment of the present disclosure.

Referring to FIG. 5, when a battery temperature rapidly rises in a state where the batteries and the controllers match each other as shown in FIG. 2, the processor 140 may determine that a problem has occurred in a corresponding battery to stop supplying power from the corresponding battery.

In other words, when a temperature of a battery that is supplying power rises above a certain level or a predetermined reference temperature due to the surrounding environment or abnormal operation, the processor 140 may cut off the corresponding battery and change to another battery.

While the second controller 320 receives power from the second battery 220 to be updated, the processor 140 checks the temperature of the second battery 220 by using the present state information of the battery (S301).

For example, when the temperature of the second battery 220 rises by about 15° C. for 1 minute or the temperature of the second battery 220 rises above 70° C. (S302), the second battery 220 transfers battery temperature information to the processor 140 (S303), and the processor 140 opens the switch S5 that is closed to the second battery 220 in order to cut off the power that is being supplied from the second battery 220. That is, all switches connected to the second battery are opened.

The processor 140 closes the switch S8 to supply power from the third battery 230 to the second controller 320 in order to re-start the update of the second controller 320 (S304).

Then, in the case where overheating occurs or the third battery 230 is expected to have insufficient charge when the, the processor 140 opens the switch S9 to cut off the connection with the previously connected third controller (S305).

As such, according to the present disclosure, it is possible to update the controllers of the mobility system stably and efficiently by including a switching element for controlling a connection between one or more batteries and one or more controllers and efficiently switching the switching element in consideration of states of the batteries and a driving situation of the mobility system.

Figure 6:
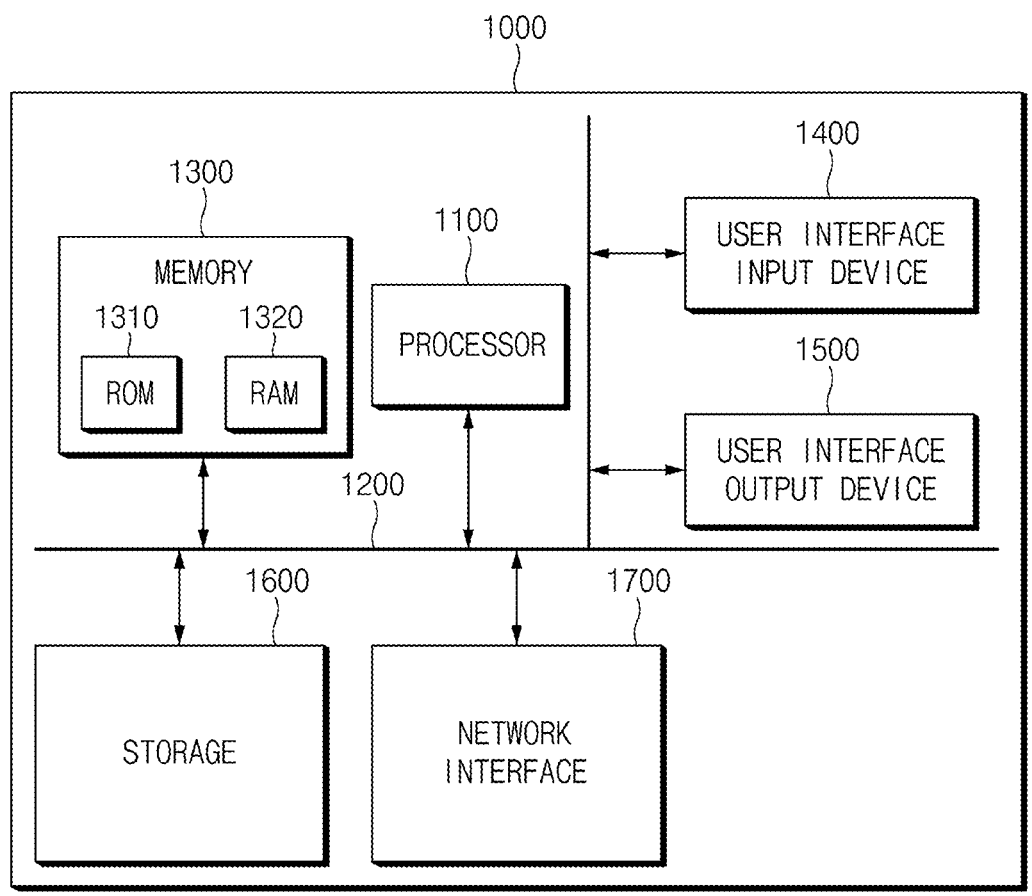
FIG. 6 illustrates a computing system according to an exemplary embodiment of the present disclosure.

FIG. 6 illustrates a computing system according to an exemplary embodiment of the present disclosure.

Referring to FIG. 6, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A mobility system comprising:
one or more controllers;
one or more batteries;
a switching device configured to switch connections between the one or more controllers and the one or more batteries; and
an update management apparatus configured to determine an update order of update target controllers among the one or more controllers and batteries that will supply power to the update target controllers among the one or more batteries based on relative importance of the one or more controllers, a present state of the one or more batteries, and a vehicle driving state, and to control the switching device based on the determined update order and the batteries that will supply power to the update target controllers.

2. The mobility system of claim 1, wherein
the switching device includes
one or more switching elements configured for one-to-one correspondence between the one or more controllers and the one or more batteries.

3. The mobility system of claim 2, wherein:
the one or more batteries include a first battery and a second battery, and
the one or more controllers include a first controller and a second controller.

4. The mobility system of claim 3, wherein
the switching device includes:
a first switching element connected between the first battery and the first controller;
a second switching element connected between the first battery and the second controller;
a third switching device connected between the second battery and the first controller; and
a fourth switching element connected between the second battery and the second controller.

5. The mobility system of claim 4, wherein
the update management apparatus
controls the first switching element to be closed and the second switching element to be opened such that the first battery supplies power to the first controller, and
controls the third switching element to be opened and the fourth switching element to be closed such that the second battery supplies power to the second controller.

6. The mobility system of claim 5, wherein
when a battery capacity level of the first battery is less than a battery capacity level required for the update of the first controller,
the update management apparatus uses the second battery by opening the first switching element and closing the third switching element to update the first controller.

7. The mobility system of claim 5, wherein
when the first controller has higher update importance than the second controller,
a battery capacity level of the first battery is less than a battery capacity level required for the update of the first controller, and
a battery capacity level of the second battery is less than a sum of battery capacity levels required for updating the first controller and the second controller,
the update management apparatus opens the first switching element and the fourth switching element, and closes the third switching element.

8. The mobility system of claim 5, wherein
in a case where:
the first controller among the one or more controllers are not able to be updated while the vehicle is driving and
the second controller among the one or more controllers are able to be updated while the vehicle is driving, and
when the vehicle starts driving during the update of the first controller while the vehicle is stopped,
the update management apparatus stops the update of the first controller and performs the update of the second controller first by opening the first switching element.

9. The mobility system of claim 5, wherein
when the temperature of the first battery is abnormal, the update management apparatus opens the first switching element, and closes the third switching element.

10. The mobility system of claim 9, wherein
when overheating of the second battery or insufficient charge thereof is expected,
the update management apparatus opens the fourth switching element.

11. The mobility system of claim 1, wherein
when a battery capacity level of the one or more batteries is less than estimated power consumption for updating a controller to which the one or more batteries supply power among the one or more controllers,
the update management apparatus controls power to be supplied to a corresponding controller by using another battery having a sufficient battery capacity level among the one or more batteries.

12. The mobility system of claim 1, wherein
the update management apparatus
determines that temperature abnormality of the one or more batteries has occurred.

13. The mobility system of claim 12, wherein
when a temperature of the one or more batteries rises by a predetermined amount for predetermined time, or
the temperature of the one or more batteries rises above a predetermined temperature,
the update management apparatus determines that the temperature abnormality of the one or more batteries has occurred.

14. An update management method of a mobility system, comprising:
determining an update order of update target controllers among one or more controllers and batteries that will supply power to the update target controllers among one or more batteries by using relative importance of the one or more controllers, a present state of the one or more batteries, and a vehicle driving state; and
switching connections between the update target controllers and the batteries that will supply power depending on a determined result of the determining.

15. The update management method of claim 14, wherein
the switching includes
controlling switching elements configured for one-to-one correspondence between the one or more controllers and the one or more batteries.

16. The update management method of claim 14, wherein
the determining includes:
performing an update by using a first battery among the one or more batteries when updating a first controller among the one or more controllers; and
performing an update by using a second battery among the one or more batteries when updating a second controller among the one or more controllers.

17. The update management method of claim 16, wherein
the switching includes:
when a battery capacity level of the first battery among the one or more batteries is smaller than a battery capacity level required for the update of the first controller,
opening a first switching element connected between the first battery and the first controller;
maintaining an open state of a second switching element connected between the first battery and the second controller;
closing a third switching element connected between the second battery and the first controller; and
maintaining an open state of a fourth switching element connected between the second battery and the second controller.

18. The update management method of claim 17, wherein
the switching includes
when the first controller has higher update importance than the second controller,
a battery capacity level of the first battery is less than a battery capacity level required for the update of the first controller, and
a battery capacity level of the second battery is less than a sum of battery capacity levels required for updating the first controller and the second controller,
opening the first switching element and the fourth switching element, and closing the third switching element.

19. The update management method of claim 17, wherein
the switching includes
in the case where the first controller is not able to be updated while the vehicle is driving and the second controller is able to be updated while the vehicle is driving,
and when the vehicle starts driving during the update of the first controller while the vehicle is stopped,
stopping the update of the first controller and performing the update of the second controller first by opening the first switching element.

20. The update management method of claim 17, wherein
the switching includes
when the temperature of the first battery is abnormal,
opening the first switching element, and closing the third switching element.

* * * * *